United States Patent Office 2,876,263
Patented Mar. 3, 1959

2,876,263

POLYOXYALKYLENE CYCLIC HYDROCARBON SUBSTITUTED AMINES AND THEIR AMMONIUM SALT DERIVATIVES

Victor Mark, Riverside, Ill., assignor to Universal Oil Products Company, Des Plaines, Ill., a corporation of Delaware No Drawing. Application December 31, 1952
Serial No. 329,091

10 Claims. (Cl. 260—573)

This invention relates to a novel class of amines having surface active properties which are formed by the condensation of a polyoxyalkylene glycol or alkylene oxide with a cyclic hydrocarbon amine. The invention also relates to the ammonium salts derived from the above-indicated amines by reaction of the amine with an acid-acting compound under conditions whereby the amine is converted to the corresponding ammonium cationic salt thereof.

This invention concerns an homologous series of compounds characterized as amines and their corresponding ammonium salt derivatives containing one or two hydrocarbon substituents attached to the amino nitrogen atom as a hydrophobic group and containing one or two polyoxyalkylene chains attached to the same nitrogen atom as the hydrophilic portion of the compound. These compounds in general have surface active properties and in particular instances act as detergents in aqueous solution. One series of the present compounds, herein characterized as cyclic hydrocarbon substituted amines, which act as non-ionic or slightly cationic surface active agents in aqueous solution, have the folowing structure:

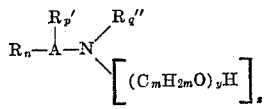

Another series of the present compounds have cationic properties in aqueous solutions thereof and may be considered as ammonium salt derivatives of the above substantially non-ionic compounds. These compounds have the following general structure:

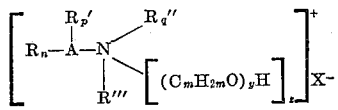

In the above compounds, R, R' and R'' are each and independently selected from hydrocarbon groups containing from 1 to about 20 carbon atoms per group, said groups R, R' and R'' containing a total of at least 5 carbon atoms, A is an aromatic or hydroaromatic radical of either mononuclear or poly-nuclear structure, $n$ and $p$ are independently chosen numerals selected from 0, 1 and 2, Z is 1 or 2, $q$ is equal to 2−Z, $m$ is a whole number having a value of from 2 to 5, $y$ is a whole number having a value from 2 to about 30, R''' is selected from the group consisting of hydrogen, alkyl and aralkyl containing from 1 to 20 carbon atoms, and X is an organic or inorganic mono- or polyvalent anionic radical such as formate, acetate, propionate, and other fatty acid derived anions, oxalate, laurate, phenylsulfonate, benzoate, naphthenate, nitrite, borate, sulfate, sulfonate, halide, nitrate, sulfite, carbonate, etc.

In one of its embodiments the present invention concerns a compound selected from the cyclic hydrocarbon-mono- and di-polyoxyalkylene N-substituted mono-amines and the ammonium salt derivatives thereof, said compound containing a cyclic hydrocarbon radical and at least one omega-hydroxyalkylpolyoxyalkylene radical attached to the amino nitrogen atom thereof, the polyoxyalkylene radical being further characterized in that it contains an average of from 1 to about 30 oxyalkylene units per radical, each unit containing from 2 to 5 carbon atoms.

A more specific embodiment relates to a composition of matter comprising a compound having the structure of an N, N-dipolyoxyethylene-ω-hydroxyethyl-alkylaniline, the alkyl substitutent of the aryl nucleus containing from about 6 to about 15 carbon atoms and each of said polyoxypolyethylene N-substituents containing an average of from 1 to about 20 oxyethylene units.

The compounds of the present invention which possess surface active properties and particularly detergency in aqueous solutions thereof may be formed by several alternative procedures, although the procedure involving the following sequence of steps is generally considered the most direct in producing the preferred products of the present invention containing one or two long chain alkyl substituents on the cyclic hydrocarbon nucleus: (1) alkylating a cyclic hydrocarbon selected from the mono- and di-cyclic aromatic hydrocarbons containing at least two replaceable nuclear hydrogen atoms with an olefinic hydrocarbon alkylating agent containing from 5 to about 9 carbon atoms in the case of utilizing a di-nuclear cyclic hydrocarbon feed stock, and from about 6 to about 20 carbon atoms per molecule in the case of utilizing a mono-cyclic aromatic hydrocarbon, said alkylation being effected in the presence of an alkylation catalyst at condensation reaction conditions, (2) subjecting the resulting alkyl-substituted cyclic hydrocarbon containing one and not more than two long-chain nuclear alkyl substituents derived from the olefinic hydrocarbon alkylating agent to nitration at reaction conditions sufficient to introduce a single nitro radical on the cyclic hydrocarbon nucleus, (3) reducing the nitro radical of the resulting nitro alkyl cyclic hydrocarbon to an amino group by subjecting said nitration reaction product to hydrogenation thereby forming the amine corresponding to the nitro substituted alkylcyclic hydrocarbon, and (4) thereafter reacting the amino-substituted alkylcyclic hydrocarbon with an alkylene oxide or a polyoxyalkylene glycol of the desired chain-length to form the omega-hydroxy-polyoxyalkylene condensation product of the cyclic hydrocarbon amine. If the mono- or dicyclic alkyl naphthenes are desired as the alkyl substituted cyclic hydrocarbon portion of the molecule, the corresponding alkyl mono- or dicyclic nitro-aromatics formed as a result of the preceding alkylation and nitration sequence of reactions may be hydrogenated both to saturate the aromatic ring and to reduce the nitro group to an amino radical. The above series of reactions, wherein a di-hydrogen containing amino-substituted alkylcyclic hydrocarbon is formed as an intermediate product of the reaction, contains two omega-hydroxy-polyoxyalkylene chains on the amino nitrogen atom. In the event that a single polyoxyalkylene chain is desired on the amino nitrogen atom, the starting material is a secondary amine wherein one of the hydrogen atoms of the intermediate amine is replaced by a non-condensable hydrocarbon radical selected from alkyl, aryl, aralkyl, or alkaryl, which do not undergo condensation with the alkylene oxide or polyoxyalkylene glycol reactant. The single, remaining hydrogen substituent on the amino group therefore undergoes condensation with the alkylene oxide or glycol to form a mono-polyoxyalkylene-substituted amine. The product of the above series of reactions is a slightly cationic compound (i. e. ionizes slightly in aqueous solution due to the tervalent nitrogen atom in its structure) and is an effective water soluble detergent. When a cationic product is desired, the previously formed intermediate product containing a tervalent amino nitrogen atom having an unshared pair of electrons is further reacted with an acid-acting compound which converts the unshared pair of electrons on the amino nitrogen atom into a pair of electrons shared by a hydrogen atom or a hydrocarbon radical, thereby converting the cyclic hydrocarbon amine to an ammonium salt capable of ionizing in an aqueous solution to an ammonium cation associated with an anion derived from the acid-acting compound. Thus, the slightly cationic amine compound may be reacted with a molar equivalent of an acid, such as hydrochloric acid, hydrobromic acid, nitric acid, benzene sulfonic acid and sulfuric acid, or with another acid-acting compound such as an alkyl halide or aralkyl halide or sulfate to convert the amine into a cationic ammonium salt.

It is to be noted that although long chain alkyl-substituted cyclic hydrocarbon amines containing a single long chain alkyl substituent having from about 5 to about 20 carbon atoms per alkyl group on the cyclic hydrocarbon ring, are generally the preferred species of the present surface active agents because of their highly effective detersive properties, the present invention also relates to other species of compounds useful as wetting agents, emulsifying agents etc. which contain no long chain alkyl radical substituted directly on the cyclic hydrocarbon nucleus, but rather, in a hydrocarbon radical substituted on the amino nitrogen atom. Other species of the present series of compounds are the polyalkyl substituted cyclic hydrocarbon amines, containing multiple nuclear alkyl substituents and one or two polyoxypolyalkylene groups on the amino nitrogen atom. Thus, the invention also concerns compounds of the type having the following general structure:

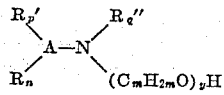

wherein $n$ and $p$ are zero, $q$ is 1, and $R''$ is alkyl containing from 1 to about 20 carbon atoms, aryl, aralkyl, or alkylaryl, said compounds being effective wetting agents. When $R''$ is a long chain alkyl group, such as a $C_9$ to $C_{20}$ radical, the products usually possess detergency. Still another species of this invention are the compounds represented by the above formula in which $n$ and $p$ are at least 1 and $q$ is zero or 1, provided that the sum of the number of carbon atoms in R and R' and R'' is at least 5 in order for the products to possess any significant degree of detergency.

Other forms of the present products have the following structural formula:

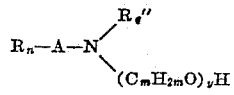

and

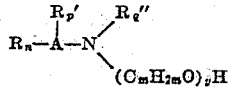

wherein the radicals R and R' are alkyl groups containing from 1 to 20 carbon atoms per group and R'' has the same designation as above. Generally, it is preferred that when one of the groups: R, R' or R'' is a long chain alkyl group containing 5 or more carbon atoms, the other radicals of the group are hydrogen or short chain alkyl groups such as methyl, ethyl, propyl, butyl, or amyl, although the effectiveness of the product is not necessarily limited to such structural configurations.

Cyclic hydrocarbon compounds, comprising one of the primary charging stocks to the alkylation stage of the present process in which the intermediate long-chain alkyl cyclic hydrocarbon is formed, are characterized generally as cyclic hydrocarbons containing at least 2 nuclearly replaceable hydrogen atoms on the cyclic hydrocarbon nucleus and may in addition, contain other nuclear alkyl substituents. Typical specific examples of such cyclic hydrocarbons utilizable as the alkyl acceptor reactant in the alkylation stage of the process include members not only of the benzene series, that is, the mono-cyclic aromatic compounds, but also includes polycyclic aromatics such as, for example, members of the naphthalene series, the anthracene and phenanthrene series, the biphenyl series, the tetrahydronaphthalene series, and the like. Thus, typical compounds utilizable in the process include such hydrocarbons as benzene, toluene, ethylbenzene, propylbenzene, (such as cumene and 1-phenylpropane), butylbenzenes, such as 1-phenylbutane, sec-butylbenzene, tert-butylbenzene; dialkylbenzenes such as ethyltoluene etc.; naphthalene; the various alkyl naphthalenes such as methyl and ethyl naphthalene; phenanthrene and the alkyl-phenanthrenes; the partially hydrogenated polynuclear aromatic hydrocarbons containing at least one aromatic ring, such as 1,2,3,4-tetra-hydronaphthalene, etc.; and the higher alkyl-substituted cyclic hydrocarbons of the above series. Compounds of this invention containing a naphthene ring or a partially hydrogenated polynuclear aromatic ring system are formed by hydrogenating the corresponding aromatic compounds following the introduction of the amino group into the ring of the aromatic compound via nitration and reduction of the nitro group to an amino radical.

The unsubstituted and lower alkyl-substituted cyclic hydrocarbons utilizable as starting materials in the present process may generally be obtained from naturally occurring sources of hydrocarbons, for example, by separating the hydrocarbon from a petroleum-derived fraction, as in the case of benzene, toluene, xylene, naphthalene, which are present in petroleum crudes and particularly in certain fractions of reformed or hydroformed gasolines. The higher alkyl cyclic hydrocarbons, containing one or more alkyl substituents of four or more carbon atoms per alkyl group generally are difficult to separate in a pure form from naturally occurring sources of such hydrocarbons and generally must be produced by synthesis from the unsubstituted or lower alkyl substituted cyclic hydrocarbons. One of the most readily available methods for synthesizing higher (or long-chain) alkyl-substituted cyclic hydrocarbons involves alkylating the unsubstituted or lower alkyl-substituted cyclic hydrocarbon containing at least two nuclearly replaceable hydrogen atoms with an alkylating agent (preferably a mono-olefin) having an alkyl group condensable with the cyclic hydrocarbon under alkylating reaction conditions. Thus, a long-chain alkyl group, for example one containing from 5 to about 20 carbon atoms per group, and generally not more than two of such groups, may be substituted on the cyclic hydrocarbon nucleus to provide an alkylate containing one or two long chain alkyl groups per molecule. Suitable olefinic hydrocarbon alkylating agents may be selected from the straight chain or branched chain olefinic hydrocarbons which may be obtained from various sources, such as from petroleum and